United States Patent [19]

Muzumdar et al.

[11] 4,375,584
[45] Mar. 1, 1983

[54] MODULAR TELEPHONE KEYSET STRUCTURE

[75] Inventors: Deepak Muzumdar; William Levine, both of Boca Raton; Gerry Suarez, West Palm Beach; Rolf Schneider, Boca Raton; Theodore W. Wagner, West Palm Beach, all of Fla.

[73] Assignee: Siemens Corporation, Iselin, N.J.

[21] Appl. No.: 194,622

[22] Filed: Oct. 6, 1980

[51] Int. Cl.³ .............................................. H04M 1/02
[52] U.S. Cl. .............................. 179/100 D; 179/1 PC; 179/99 R; 179/178; 179/179
[58] Field of Search ............ 179/1 PC, 100 R, 100 D, 179/100 L, 178, 179, 98, 99 R, 99 LC; 361/394, 413, 395, 399, 412, 415; 339/17 F, 17 M, 17 LM

[56] References Cited

U.S. PATENT DOCUMENTS

| | | | |
|---|---|---|---|
| 3,727,168 | 4/1973 | Henschen et al. | 361/413 |
| 3,881,071 | 4/1975 | Willis et al. | 179/179 |
| 3,916,103 | 10/1975 | Morrell et al. | 179/1 PC |
| 3,941,951 | 3/1976 | Engstrom et al. | 179/179 |
| 4,277,652 | 7/1981 | Branden et al. | 179/179 |
| 4,292,477 | 9/1981 | Adams et al. | 179/100 D |

OTHER PUBLICATIONS

Rolm Telecommunications Brochure; Rolm Corporation; Santa Clara, California; Apr. 1979.
Northern Telecom Brochure; "The SL-1 in Profile;" Northern Telecom; Sep. 1977.
"The Dimension Console: Something for Everyone;" Bell Labs Record; vol. 54, No. 9; p. 239-243; Oct. 1976.
H. Hansbauer & S. Schon; "Modular Telephone User Equipment Line;" Siemens Telefon report; Nos. 2-3; pp. 73-83; Mar. 1973.

Primary Examiner—G. Z. Rubinson
Assistant Examiner—Randall P. Myers
Attorney, Agent, or Firm—Karl F. Milde, Jr.

[57] ABSTRACT

A modular telephone keyset instrument is arranged within a rectangular casing having indentations in the top for receiving a telephone handset. Electrical (electronic) circuits are provided on a mother PC board, a daughter PC board and a key switch PC board, stacked within the housing from bottom to top, respectively. The daughter and keyset PC boards are connected to the mother PC board by ribbon cables. A hook switch, mounted on and attached to the daughter PC board extends through one of the indentations in the top to sense whether the telephone handset is placed in the indentations.

23 Claims, 22 Drawing Figures

MODULAR TELEPHONE KEYSET STRUCTURE

BACKGROUND OF THE INVENTION

The present invention relates to a telephone keyset system; that is, a telephone system having keysets with a number of dial, line and function keys for home or office use—which may contain one or more of a number of telephone "features" and "functions"—as well as ancillary telephone apparatus such as a busy lamp field console, a telephone accessory unit, a printer, etc.

As is well known, the standard telephone comprises an acoustic/electrical transducer or microphone, an electrical/acoustic transducer or earphone, a hook switch, a dialing mechanism and a bell or buzzer. The structure required to include these features need be no larger than a telephone handset. In fact, telephone instruments are known in which the handset itself is comprised of two pieces which are folded over when in the rest or "on-hook" position, and which fold out into a convenient handset size when lifted off a flat surface into the "off-hook" position for use in communicating.

As the cost of electronic equipment is currently falling, many hardware "features" have been and are being added to this otherwise rather prosaic device. Some typical features which a telephone instrument may include are: p1 (1) a plurality of "line" keys which, when depressed, connect the telephone to different lines;

(2) a plurality of "function" keys which, when depressed, initiate one or more of a number of telephone functions;

(3) a display which images a number of alphanumeric characters;

(4) a microphone for "handsfree" speaking;

(5) a speaker for "handsfree" listening;

(6) an external unit jack for connecting the telephone to a printer, a digital data interface unit, a magnetic recorder for taking messages, a console containing additional line and function keys and/or another unit such as an external computer, CRT display and the like; and (7) a small computer which may be utilized by the customer as a programmable element as well as to control the instrument.

Experience has shown that more and more "functions" or modes of operation have also been, and will be added to the telephone instrument to make it a most convenient and versatile piece of equipment. Not only will the telephone in the future serve each user as an instrument of voice and data communications, it will also serve other telecommunication functions such as providing music, external paging, message recording and/or dictation access; room and building security against unauthorized access and/or fire; and room and building energy control such as lighting, heat and air conditioning. As mentioned above, the telephone instrument may also serve as a small, handy computer which can operate off-line or in direct communication with another computer at another location.

When designing a telephone "keyset"—that is, a telephone instrument with a number of keys for dialing and for other functional purposes—it is desirable to take into consideration and provide for the possibility of implementing the various features and functions such as those enumerated above. More particularly, it is desirable to develop an economical and efficient telephone "package" which is not significantly larger than presently existing telephones and which may be implemented inexpensively as a "modular" telephone instrument which can be readily tailored to meet the needs of each customer. Such a modular structure would facilitate the creation of a "family" of telephones, telephone consoles and other ancillary equipment, from option-laden instruments having all the available features and functions to a basic telephone instrument constructed at minimum cost.

Simply stated, it is desired to develop a telephone keyset system structure which may be implemented inexpensively with numerous optional features and functions, or implemented, as desired, without these features and functions at a cost which is not significantly greater than the present cost of telephone instruments.

SUMMARY OF THE INVENTION

It is accordingly an object of the present invention to provide a telephone keyset instrument having an economical and efficient means of packaging all mechanical and electrical components (including option modules) required to implement all features and functions which may be desired by a telephone user.

It is a further object of the present invention to provide a modular telephone keyset structure which is small in size, which contains a minimum number of printed circuits ("PC") board types, and which is extremely flexible in serving the requirements of a number of various telephone instruments and consoles.

It is a further object of the present invention to provide a telephone keyset structure having standard, pin-compatable interfaces between various printed circuit boards so that the same type of ribbon cables may be used between all boards to take advantage of high volume pricing.

These objects, as well as other objects which will become apparent from the discussion that follows are achieved, according to the present invention, by providing a telephone keyset structure having the following basic components:

The keyset structure is contained in a substantially rectangular casing formed of a base, a main housing and a top face panel. The face panel has two indentations on one side for receiving the microphone and earphone, respectively, of the telephone handset. The face panel, in its central portion, also has openings for a plurality of keys for dialing, line selection and function selection.

Arranged within the casing, just above and substantially parallel with the bottom of the base, is a mother PC board containing electric circuits for interfacing with the telephone subscriber line and the telephone handset. The mother PC board is laterally co-extensive with the base; that is, it is nearly as wide and deep as the base.

Also arranged within the casing, above and substantially parallel with the mother PC board, is a daughter PC board containing electric circuits for interfacing with a hook switch. The daughter PC board is laterally co-extensive with at least the portion of the mother PC board which lies beneath the indentations in the face panel. A hook switch is mounted on and attached to the daughter PC board and extends through an opening in one of the indentations. This hook switch is electrically connected to the daughter PC board and senses whether the telephone handset is placed in the indentations.

A key switch PC board is arranged within the casing above the daughter PC board and directly beneath and parallel to the face panel. This key switch PC board, which is laterally co-extensive with the central portion of the face panel which includes openings for the keys, mechanically holds and provides an electrical connection to each of the keys.

Finally, both the daughter PC board and the key switch PC board are connected to the mother PC board by means of ribbon cables. Preferably, these cables are both of the same type to take advantage of high volume pricing.

Whereas the mother PC board and daughter PC board are both parallel with the base of the casing, the key switch PC board is parallel with the face panel. Preferably, the face panel is set at an angle with respect to the bottom of the base so that the keys of the telephone are more accessible to the user. This angle may lie anywhere between 5° and 20°, but is preferably approximately 13°.

In one preferred form of the telephone keyset instrument according to the invention, the face panel has a grill opening between the two indentations and a telephone speaker is arranged immediately below the face panel in alignment with the grill opening to transmit sounds through this opening. Preferably, the speaker is electrically connected to the key switch PC board.

In another preferred form of the telephone keyset instrument according to the invention, the face panel includes a window for viewing an alphanumeric character display. This alpha-numeric character display device is attached to the housing immediately beneath and in alignment with the window to display alpha-numeric characters to the user of the telephone. The display device is electrically connected to a display PC board which is either integral with or attached to the key switch PC board.

If the handsfree operation is desired, the telephone keyset instrument should include, in addition to a speaker and microphone, a handsfree unit PC board containing electric circuits for interfacing with the speaker and microphone. This handsfree unit PC board is preferably arranged above the mother PC board and substantially coplanar with the daughter PC board. An additional ribbon cable is provided to connect the mother PC board with the handsfree unit PC board unit.

In another preferred form of the telephone keyset according to the invention, the mother PC board has a number of jack assemblies or electrical connectors, providing electrical connections to a number of telephone components in addition to the daughter PC board and handsfree unit PC board as described above. In particular, jack assemblies are provided for connection to the handset, to the subscriber line, to an auxiliary unit such as a printer, and to a microphone for the handsfree operation.

For a full understanding of the present invention, reference should now be made to the following detailed description of one preferred embodiments of the invention and to the accompanying drawings.

DESCRIPTION OF THE PREFERRED EMBODIMENTS

The preferred embodiments of the present invention will now be described with reference to FIGS. 1-22 of the drawings. Identical elements shown in the various figures have been assigned the same reference numerals.

Figure 1:
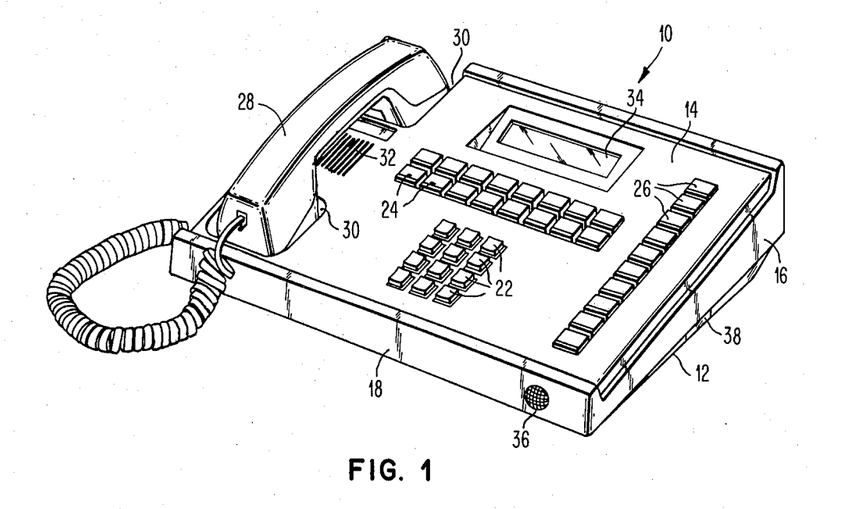
FIG. 1 is a perspective view of a large telephone keyset instrument with a display.
Figure 2:
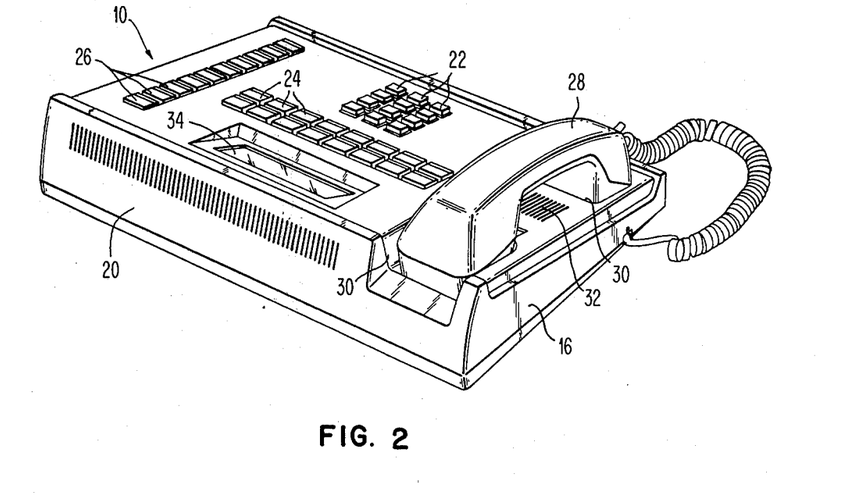
FIG. 2 is a perspective view of the top and back of a telephone keyset shown in FIG. 1.

FIGS. 1 and 2 show the external form of a telephone keyset instrument 10 constructed according to the principles of the invention. The keyset instrument 10 has a casing formed of a base 12, a face panel 14 and a main housing 16. The main housing 16 has a front 18, a back 20 and two lateral sides. Extending through the face panel 14 are a set of dial keys 22, a set of line keys 24 and a set of function or feature keys 26. A telephone handset 28 is inserted in two indentations 30 in the face panel 14. Beneath the handset and between the indentations 30 is a grill opening 32 for a loudspeaker. The face panel 14 also has a window 34 for an alphanumeric character display. This window is recessed at an angle to permit optimum viewing by the user of the telephone keyset instrument. The front side 18 of the housing has an opening 36 for a microphone. The microphone and loudspeaker may be used in the telephone keyset instrument, in place of the handset 28, for "handsfree" operation. Finally, one lateral side of the housing has an opening 38 to receive an electrical connector from an auxiliary unit.

Figure 3:
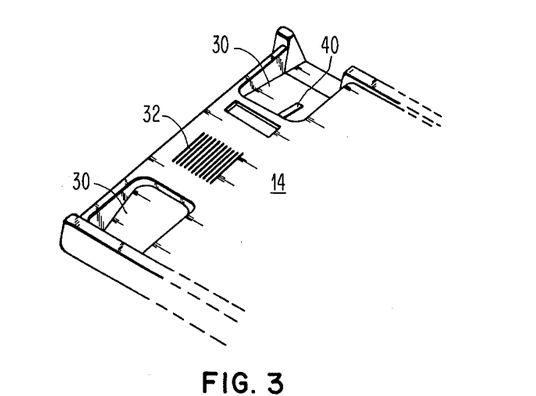
FIG. 3 is a perspective view of one end of a telephone keyset instrument, according to the invention, with the handset removed.
Figure 4:
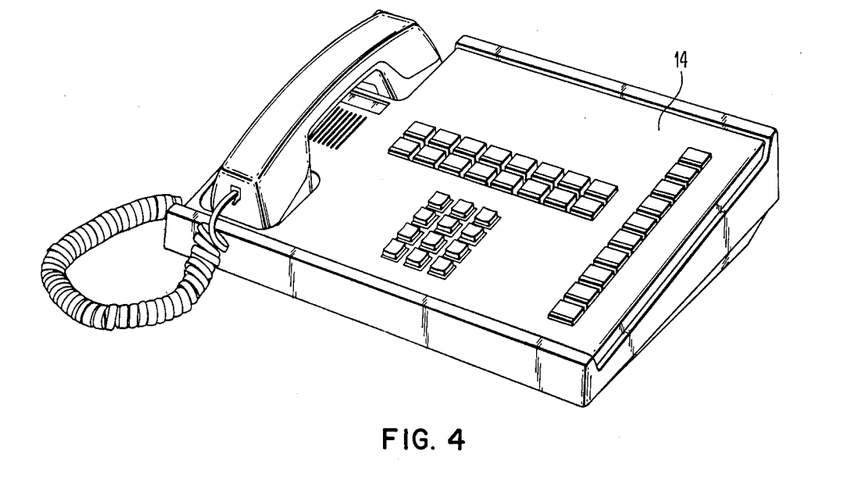
FIG. 4 is a perspective view of a large telephone keyset instrument without a display.
Figure 5:
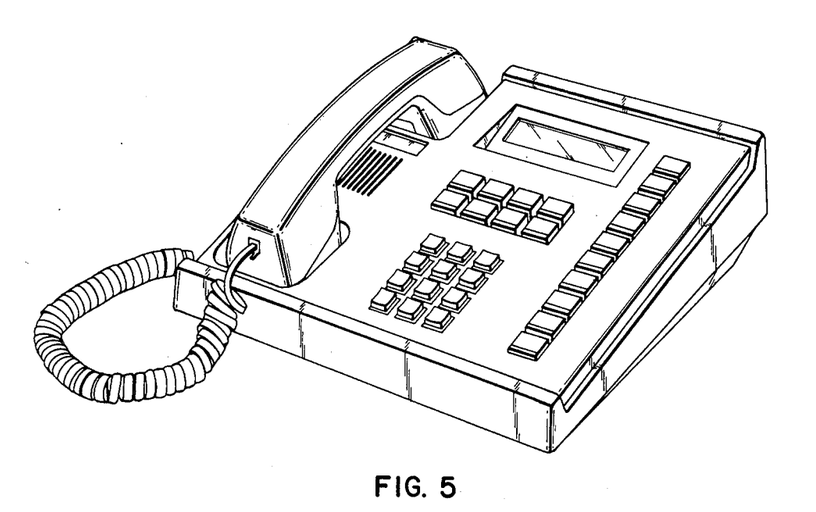
FIG. 5 is a perspective view of a small telephone keyset instrument with a display.
Figure 6:
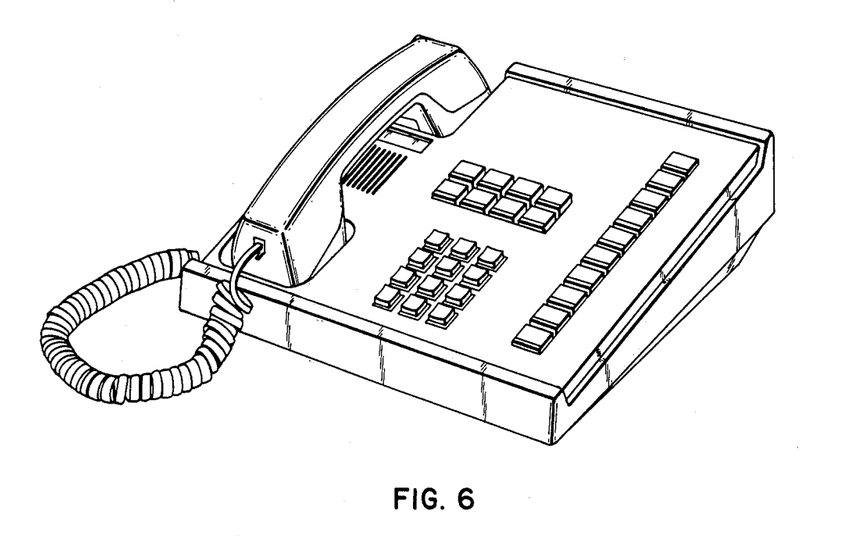
FIG. 6 is a perspective view of a small telephone keyset instrument without a display.

FIG. 3 shows the indentations 30 in the face panel 14 with the handset 28 removed. The indentation at the back of the telephone instrument has a slot 40 for the contact element of a hook switch. As is conventional, this contact element senses the presence of the handset 28. FIGS. 4–8 show other configurations of telephone instruments, according to the present invention, having the same basic structure as the instrument illustrated in FIGS. 1–3. The instrument in FIG. 4 is identical to that shown in FIGS. 1 and 2 except that the face panel 14 does not have an opening for an alphanumeric display. FIGS. 5 and 6 show a telephone keyset instrument having fewer line keys than the instrument of FIGS. 1 and 2. Consequently, the casing is not as wide as the casing in the instrument of FIGS. 1 and 2. While the side to side dimension is different, the front to back dimension and the overall appearance and structure of the instrument is the same. The instrument of FIG. 6 differs from the instrument of FIG. 5 only in that it lacks the display.

Figure 7:
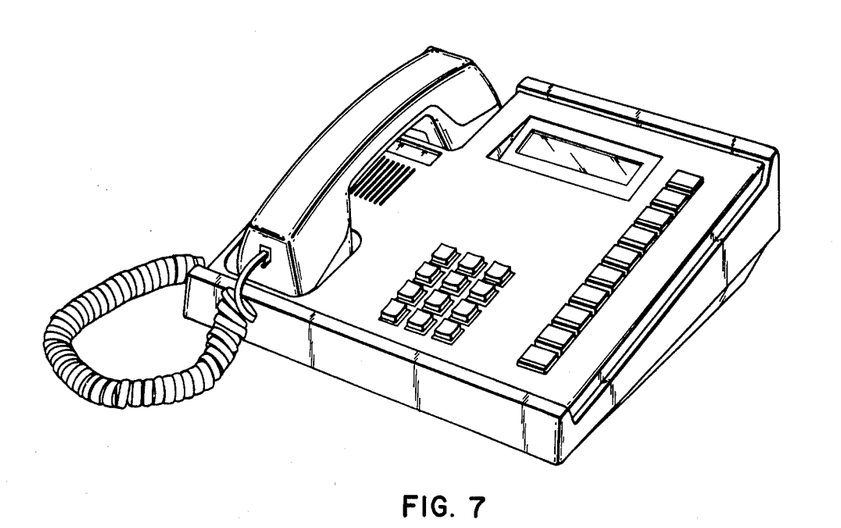
FIG. 7 is a perspective view of a single-line telephone instrument with a display.
Figure 8:
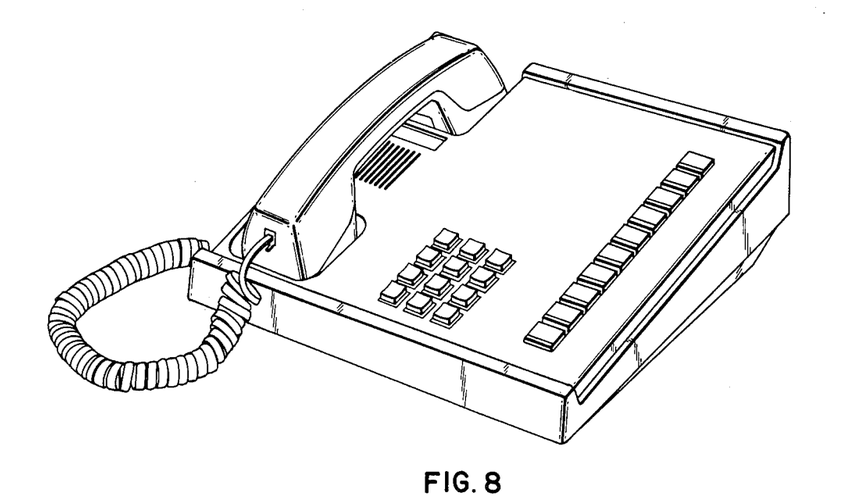
FIG. 8 is a perspective view of a single-line telephone instrument without a display.

FIGS. 7 and 8 show a telephone instrument without line keys at all. Thus, this instrument is intended for use with a single telephone line connected to the public exchange or to a private branch exchange. The instrument may therefore not be termed a "keyset" instrument in the classical sense. The instrument of FIG. 8 differs from the instrument of FIG. 7 only in that it lacks the display.

Figure 9:
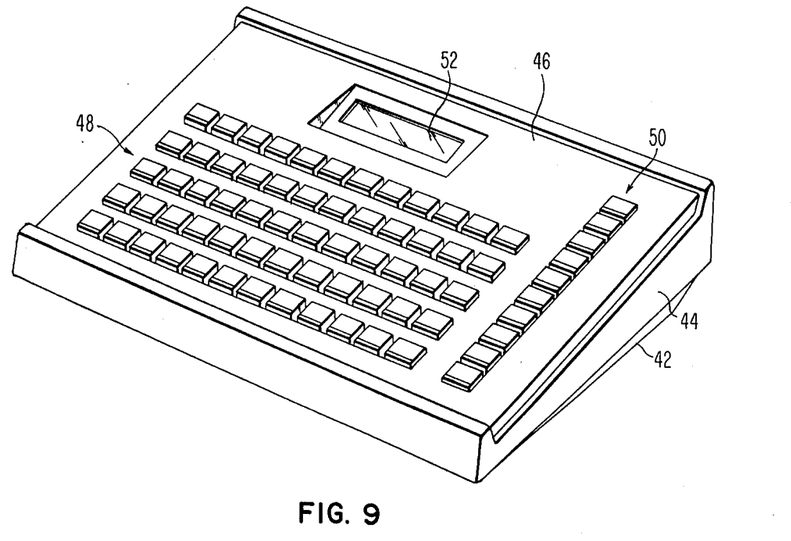
FIG. 9 is a perspective view of a large telephone busy lamp field console with a display.
Figure 10:
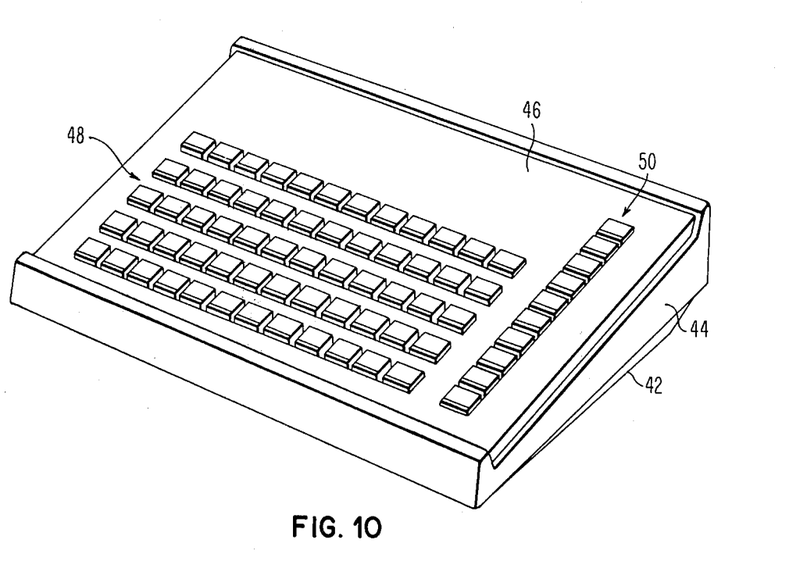
FIG. 10 is a perspective view of a large telephone busy lamp field console without a display.

FIGS. 9 and 10 illustrate a large busy lamp field console for a telephone system. The overall appearance and structure of this console is similar to that of the telephone instrument previously described. In particular, the console comprises a base 42, a main housing 44 and a face panel 46. The face panel 46 has openings to receive a plurality of line keys 48, function keys 50 and a display 52. The console of FIG. 10 does not have the display.

Figure 11:
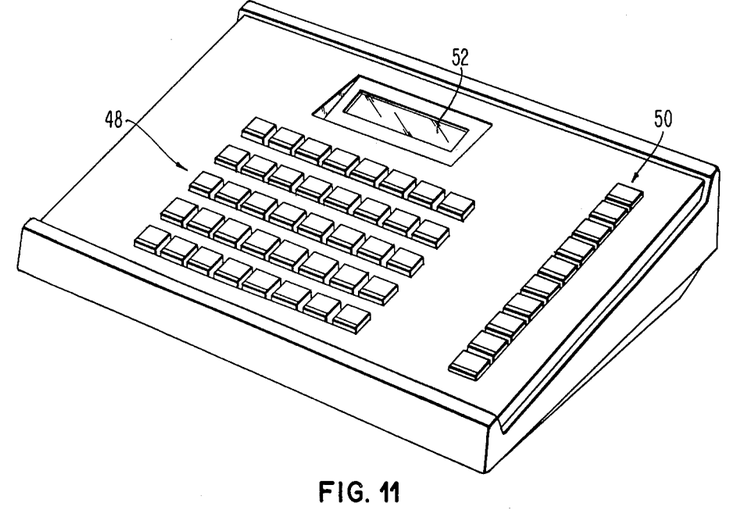
FIG. 11 is a perspective view of a small telephone busy lamp field console with a display.
Figure 12:
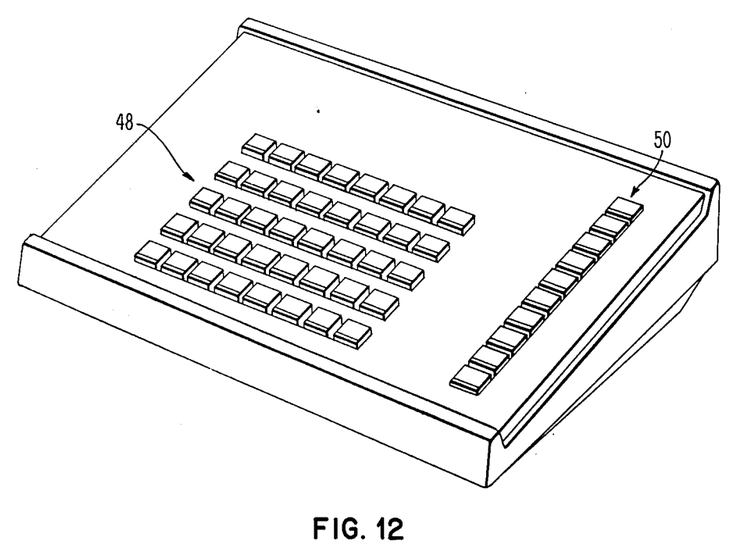
FIG. 12 is a perspective view of a small telephone busy lamp field console without a display.

FIGS. 11 and 12 show a telephone busy lamp field console which is similar in appearance and construction to the console shown in FIGS. 9 and 10. However, the console of FIGS. 11 and 12 has fewer line keys 48.

Figure 13:
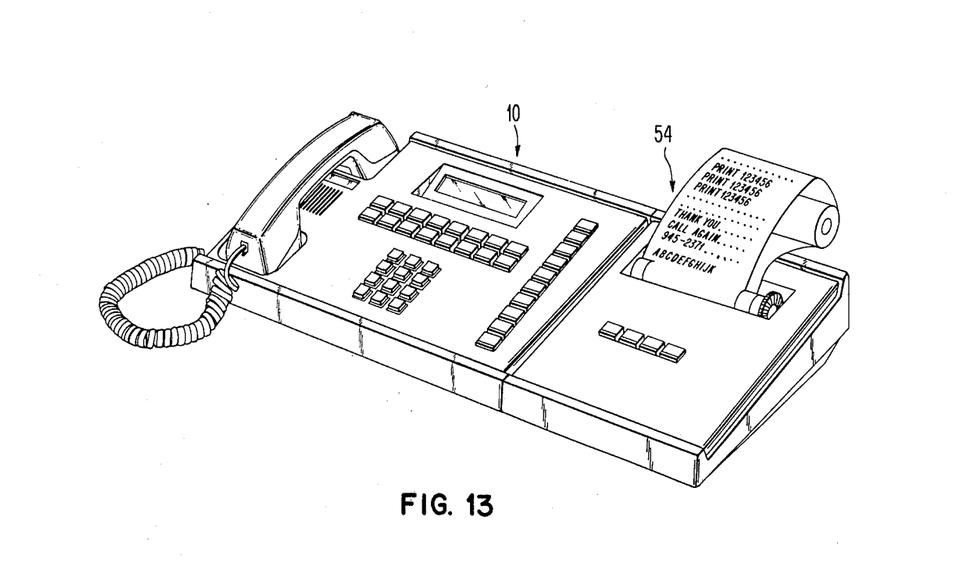
FIG. 13 is a perspective view of a telephone keyset instrument connected to an auxiliary printer.
Figure 15:
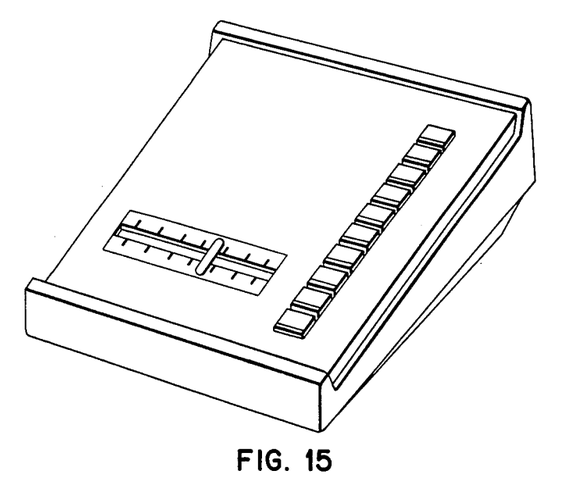
FIG. 15 is a perspective view of a digital interface unit designed for use with a telephone according to the invention.
Figure 16:
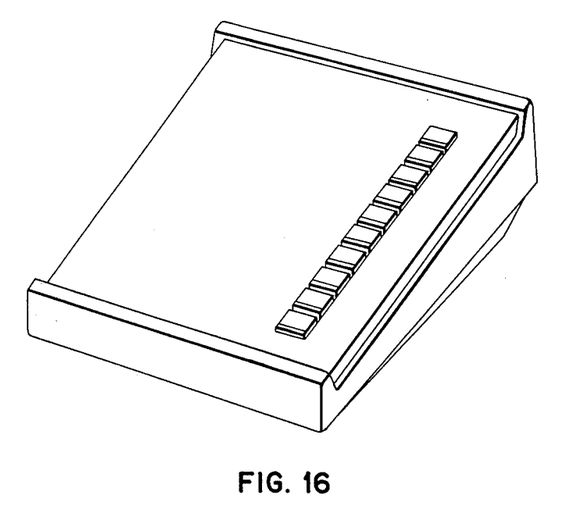
FIG. 16 is a perspective view of an accessory unit designed for use with a telephone according to the invention.

FIG. 13 illustrates a typical auxiliary unit 54 arranged adjacent to a telephone instrument 10. In this case, the auxiliary unit is a small printer of the type shown in FIG. 14; however, numerous other auxiliary units may be substituted for the printer. FIGS. 15 and 16 illustrate two such units. FIG. 15 shows a digital interface unit for transmitting and receiving digital data, for example from a computer, over telephone lines. The accessory unit shown in FIG. 16 may be used for any number of functions such as energy management within a building (wherein the temperature in each room is set and controlled by a central controller); a security management system within a building (wherein sounds are detected within each room and monitored by a central controller); and/or a business management unit (wherein dictation equipment is built into the telephone system). Numerous other auxiliary units will, of course, occur to those skilled in the art. For example, the auxiliary unit may contain additional keys for additional telephone lines and functions, or it may contain a large display and/or large memory.

Figure 17:
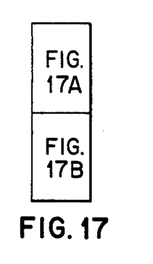
FIG. 17 is a diagramatic view showing the casing components, the printed circuit (PC) boards and other structural elements of the telephone instruments according to the present invention.
Figure 17A:
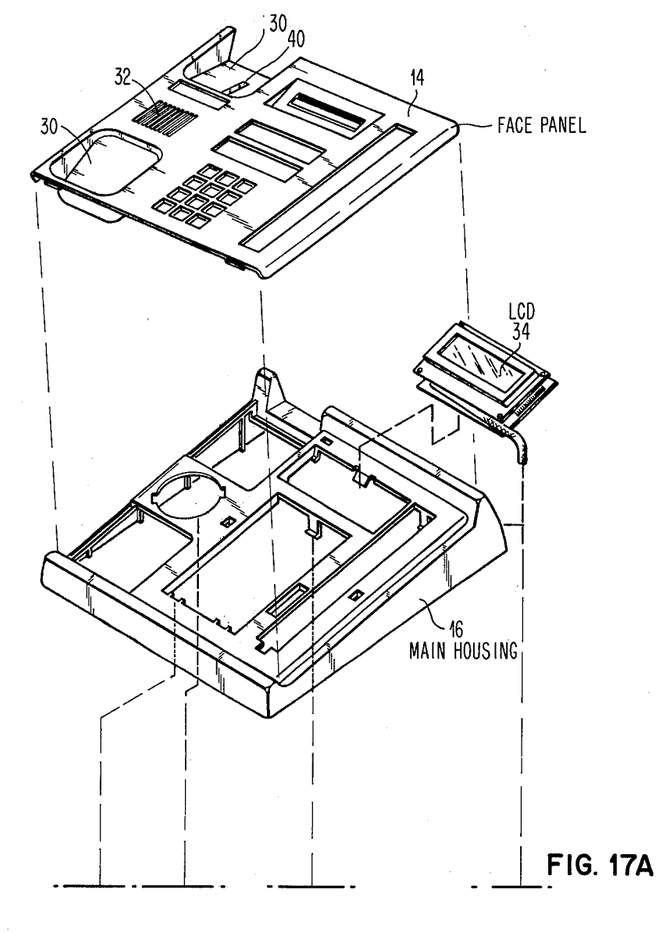
Figure 17B:
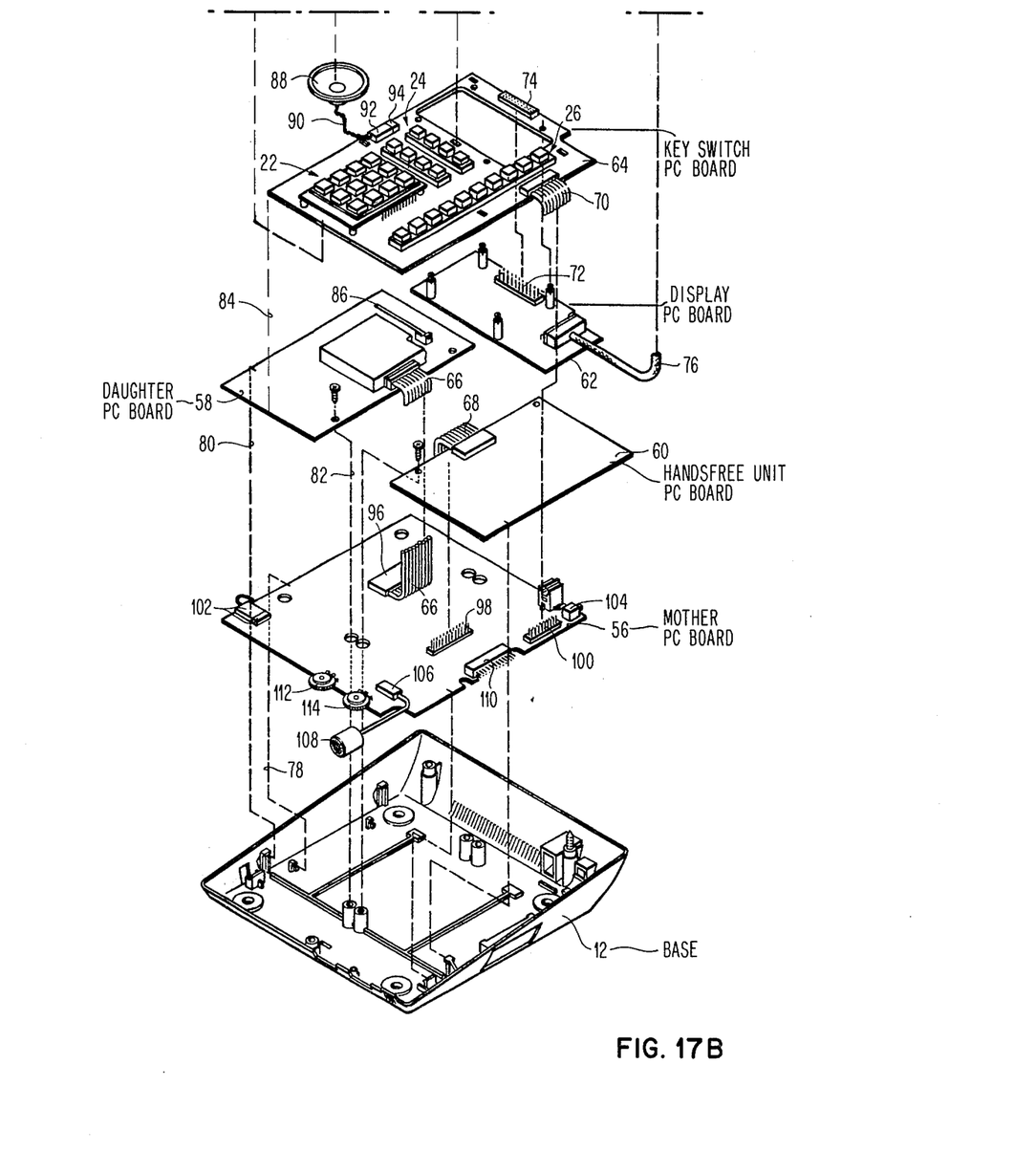
Figure 18:
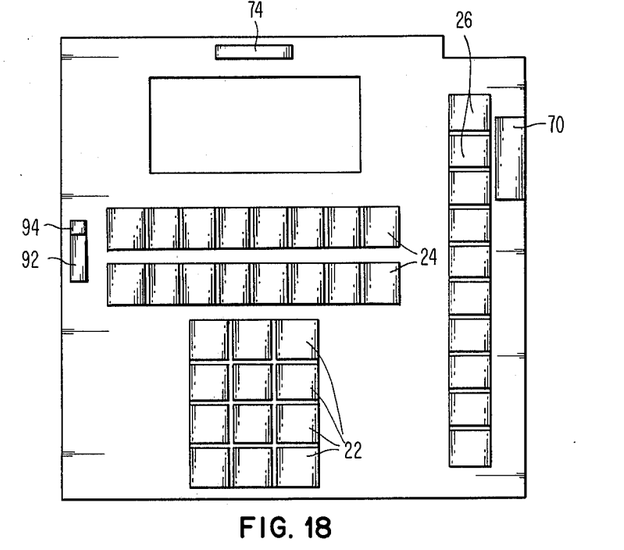
FIG. 18 is a plan view of the key switch PC board for a large telephone keyset instrument.
Figure 19:
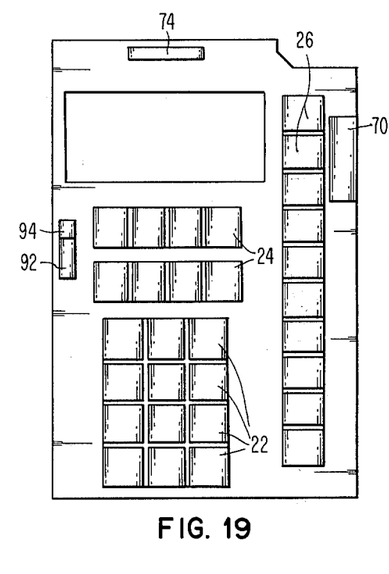
FIG. 19 is a plan view of the key switch PC board for a small telephone keyset instrument.
Figure 20:
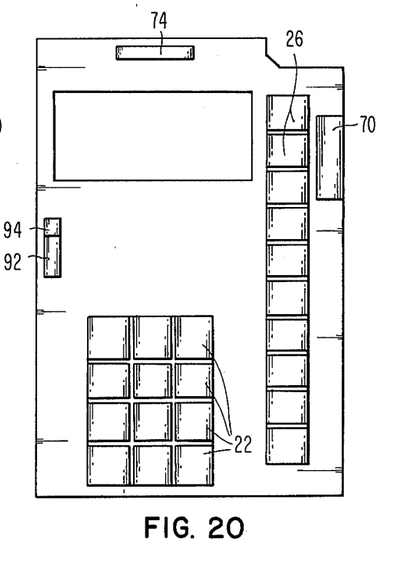
FIG. 20 is a plan view of the key switch PC board for a single-line telephone instrument.
Figure 21:
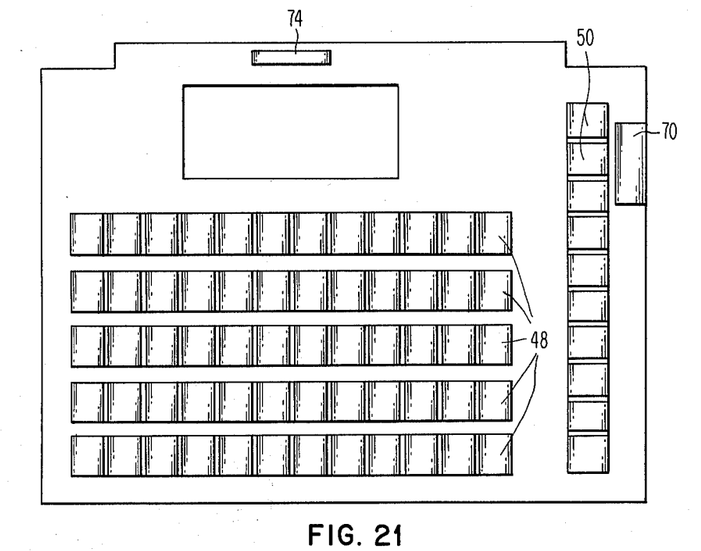
FIG. 21 is a plan view of the key switch PC board for a large telephone busy field console.
Figure 22:
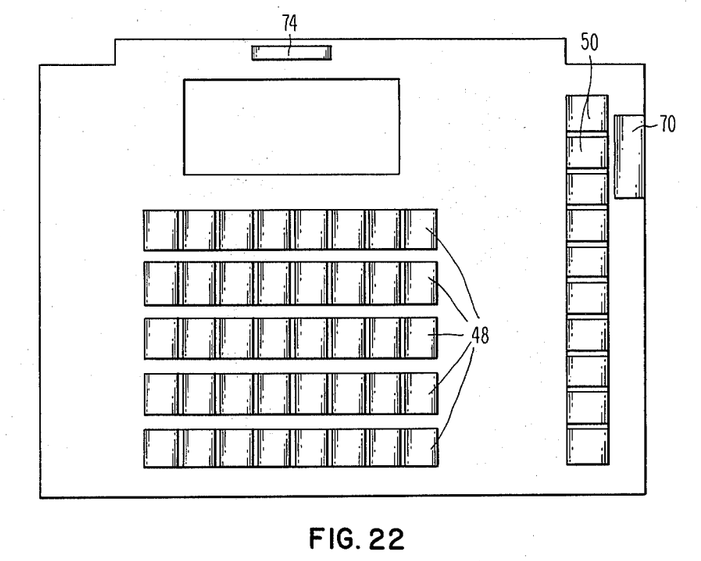
FIG. 22 is a plan view of the key switch PC board for a small telephone busy lamp field console.

The internal structure of the telephone instruments according to the invention 10 is illustrated in FIG. 17. While FIG. 17 shows, in particular, the telephone keyset instrument appearing in FIG. 5, this same basic structure is readily adaptable to the other telephone configurations as well; in particular, the telephone instruments illustrated in FIGS. 1–4 and FIGS. 6–12. It will be seen that the instruments of FIGS. 1–4 and 9–12 are slightly wider (side-to-side dimension) than the instruments of FIGS. 5–8. In addition, the openings and indentations in the main housing and face panel may differ from instrument to instrument. However, the presence and location of the various structural elements, itemized below, remain the same in all cases.

Starting from the bottom of the unit, and progressing upwardly, the structural elements are:
a base 12 constructed of sheet steel or injection molded plastic;
a mother PC board 56; a daughter PC board 58; a handsfree unit PC board 60; a display PC board 62; and a key switch PC board 64;
a main housing 16 formed of injection molded plastic; an LCD display device 34; and
a face panel 14 formed of injection molded plastic.

The various elements are connected together by means of grooves and tabs in the manner indicated. Specifically, the PC boards 56, 58 and 60 are screwed and held by tabs to the base 12 and the PC boards 62 and 64 are screwed and held by tabs to the main housing 16. The LCD display device 34 and the face panel 14 are fixed to the main housing by tabs.

As shown, the daughter PC board 58, the handsfree unit PC board 60 and the key switch PC board 64 are all connected to the mother PC board 56 via flat ribbon (26 line) cables 66, 68 and 70, respectively. Electrical connection is provided between the display PC board 62 and the key switch PC board 64 by an electric connector comprising a plug 72 and a recepticle 74. A flexible cable 76 of circular cross-section connects the display PC board 62 to the LCD display device 34.

As may be noted from the vertical dashed lines 78, 80 and 82, the daughter PC board 58 is laterally co-extensive with the side of the mother PC board 56 which lies beneath the two indentations 30 in the face panel 14. Thus, as seen in relation to the view illustrated in FIG. 17, the left-hand side of the mother PC board 56 and daughter PC board 58 are aligned with the left-hand side of the base 12.

From the line 84 it may be seen that the daughter PC board 58 extends to the left beyond the left-hand side of the key switch PC board 64. Because of this arrangement, a hook switch 86 is mounted on and attached to the daughter PC board in a position directly beneath the opening 40 in the rear indentation 30 so that the hook switch contact element extends through this opening 40 and may be actuated by the handset 28. The key switch PC board 64 does not extend into the area of the indentations 30 so that the hook switch is unobstructed.

More particularly, the four PC boards have the following relative positions: The mother PC board 56 is arranged within the base above and substantially parallel with the bottom of the instrument. As mentioned above, this mother PC board is laterally co-extensive with the base. The daughter PC board 58 and the handsfree unit PC board 60 are arranged side-by-side above and substantially parallel with the mother PC board 56. The key switch PC board 64 is arranged above the daughter PC board 58 and the handsfree unit PC board 60 just beneath the top of the main housing 16. This key switch PC board 64 is disposed in parallel with the top of the housing 16 and the face panel 14 which, as seen in FIGS. 1 and 2 for example, is set at an angle with respect to the bottom of the base. This angle lies in the range of 5° to 20°, and is preferably about 13°.

A loudspeaker 88, electrically connected by a wire 90, plug 92 and recepticle 94 to the key switch PC board 64, is arranged beneath the top of the housing in the space between the two indentations 30 and in alignment with the grill opening 32. This speaker is mechanically mounted on the main housing 16 by means of tabs. The mother PC board 56 is provided with plugs 96, 98 and 100 for connection to the ribbon cable 66, 68 and 70, respectively. The mother PC board is also provided with a jack assembly 102 for connection of the flexible cable attached to the handset 28. The mother PC board is also provided with a second jack assembly 104 for connection of the subscriber line cord and a third jack assembly 106 for connection of a microphone 108.

Figure 14:
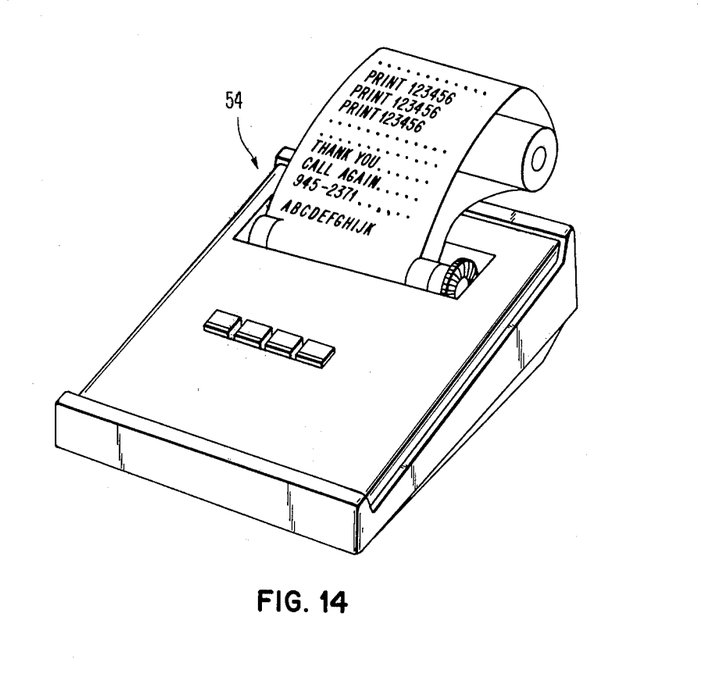
FIG. 14 is a perspective view of the printer shown in FIG. 13.

Finally, the mother PC board 56 is provided with a plug 110 for electrical connection to an auxiliary unit such as the printer 54 illustrated in FIGS. 13 and 14 and described above. Potentiometers 112 and 114 are attached to the front of the mother PC board and extend through corresponding slots in the base 12 for control of the speaker voice volume and the ringing volume, respectively.

It will be appreciated that the structure shown in FIG. 17 is extremely flexible and modular. The microphone 108 and speaker 88 may be provided or omitted from the telephone keyset instrument, as desired. If "handsfree" operation is desired, the handsfree unit PC board 60 may be included; otherwise, it may be omitted. Similarly, the LCD display device 34 and its corresponding display PC board 62 may be included or omitted without otherwise affecting the structure of the apparatus. The key switch PC board 64 may be provided with line keys 24 and/or function keys 26, or may support only the dial pad 22, as the situation demands. If line and/or function keys are not provided, or if the display is not provided, a suitable face panel 14 is used which does not contain openings for the respective keys or the display.

FIGS. 18–22 are plan views showing the key switch PC board 64 with various arrangements of keys. These arrangements correspond to the telephone instruments illustrated in the following figures:

FIG. 18—FIGS. 1-4
FIG. 19—FIGS. 5 and 6
FIG. 20—FIGS. 7 and 8
FIG. 21—FIGS. 9 and 10
FIG. 22—FIGS. 11 and 12

The various PC boards used in the telephone structure according to the invention contain all the electronic components and interconnections necessary to operate the telephone. By way of example and not limitation, the various electronic functions may be allocated to the PC boards as follows:

Mother PC Board

The mother PC board 56 contains the following:
1. Clock recovery and frame synchronization circuitry for receiving data connected to the telephone keyset instrument by the private branch exchange.
2. A microcomputer section which has the following interfaces:
   (a) An interface to the keyboard/display modules;
   (b) An interface to the optional external printer module;
   (c) An interface to control the analog section and handsfree unit; and
   (d) An interface to the frame synchronizer to send signaling data to and receive signaling data from the system.
3. A timing/control section to allow proper operation of the primary and secondary channel-codecs.
4. An analog section which has either one voice path (for the small instrument) or two voice paths (for the large instrument). The analog section consists of:
   (a) PCM codec(s) and filter(s);
   (b) An interface from the PCM filter(s) to the handset, microphone, and speaker;
   (c) A microcomputer controlled analog switch which determines whether the handset, microphone, or speaker is connected to a specific PCM filter;
   (d) A microcomputer controlled oscillator to facilitate "ringing" through the speaker or "beeping" through the handset; and
   (e) An interface to the handsfree unit.

Daughter PC Board

The daughter PC board 58 contains the following:
1. A hook switch to detect on-hook/off-hook of the handset.
2. Two pulse transformers to remove the DC current phantomed through the four wires connecting the keyset instrument to the system.
3. A DC/DC converter to generate +5 V, +12 V, and −5 V required by the keyset instrument electronics.
4. A digital transmitter capable of generating raised cosine AMI pulses from the 192 KHz data to be sent to the private branch exchange from the keyset instrument.
5. A digital receiver "front end" capable of converting weak AMI bi-polar pulses sent from the private branch exchange into 5 V unipolar pulses in a 50% duty cycle RZ (return to zero) form.

Handsfree Unit PC Board

The analog handsfree unit PC board 60 contains sufficient circuitry to interface the microphone and speaker to the primary channel codec/filter in such a way as to permit speaker phone operation. With a digital implementation, the microphone and speaker are directly interfaced to the primary channel codec/filter, and the appropriate digital signal processing is performed between the digital side of the codec and the digital AMI transmitter/receiver.

Key Switch PC Board

The key switch PC board 64 contains key switches (each with a single red LED) and a 12 button dial pad. In addition, it contains C-MOS logic which statically latches data for LEDs, drives LEDs, provides an indirect interface between the mother PC board and display PC board and the mother PC board and speaker.

Display PC Board

The display PC board 62 contains a 16-character liquid crystal alphanumeric display, a RAM (random access memory) for storing the characters in ASCII form, a character generator for determining the character set and font and a microcomputer interface.

There has thus been shown and described a novel modular telephone keyset structure which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A telephone keyset structure comprising, in combination:
   (a) a substantially rectangular casing having a bottom, a top and four sides, said top having two indentations on one side thereof for receiving the microphone and earphone, respectively, of a telephone handset and having a plurality of openings in the central portion thereof for receiving telephone keys:
   (b) a mother printed circuit board adapted to be electrically connected with a telephone subscriber line and with said handset, said mother printed circuit board being arranged within said casing above and substantially parallel to said bottom and being laterally coextensive with substantially all of said bottom;
   (c) a daughter printed circuit board arranged within said casing above and substantially parallel to said mother printed circuit board and being laterally coextensive with at least the portion of said mother printed circuit board which lies beneath said indentations of said top;
   (d) a key switch printed circuit board arranged within said casing above said daughter printed circuit board and directly beneath said top, said key switch printed circuit board being substantially parallel with said top and being laterally coextensive with the central portion of said top which includes said openings for said keys but excludes said indentations;
   (e) a first, flexible electrical cable connecting said mother printed circuit board with said daughter printed circuit board;
   (f) a second flexible, electrical cable connecting said mother printed circuit board with said key switch printed circuit board;
   (g) a telephone hook switch, mounted on said daughter printed circuit board and having a portion thereof extending through one of said indentations in said top, said hook switch being adapted to be actuated when said telephone handset is placed in said indentations; and
   (h) a plurality of telephone key switches mounted on said key switch printed circuit board and having telephone keys extending through said openings in said top to permit manual actuation thereof.

2. The telephone keyset structure recited in claim 1, wherein said first cable is a ribbon cable.

3. The telephone keyset structure recited in claim 1, wherein said second cable is a ribbon cable identical in type to said first cable.

4. The telephone keyset structure recited in claim 1, wherein said casing includes a base, a main housing and a face panel, arranged, respectively, from bottom to top, said base and said face panel being mechanically joined to said housing.

5. The telephone keyset structure recited in claim 4, wherein said mother printed circuit board and said daughter printed circuit board are mechanically joined to said base.

6. The telephone keyset structure recited in claim 5, wherein said key switch printed circuit board is mechanically joined to said housing.

7. The telephone keyset structure recited in claim 4, wherein said face panel includes a window for viewing an alphanumeric character display, and wherein said keyset structure further comprises alphanumeric character display means attached to said housing beneath said window, said display means being in alignment with said window to display alphanumeric characters to the user of said telephone.

8. The telephone keyset structure recited in claim 7, further comprising a display printed circuit board adapted to be electrically connected with said display means, said display printed circuit board being arranged within said casing below and substantially parallel with said key switch printed circuit board.

9. The telephone keyset structure recited in claim 8, wherein said display printed circuit board is mechanically joined to said key switch printed circuit board.

10. The telephone keyset structure recited in claim 1, wherein said sides of said casing include a front side and a back side, said front side being adapted to face the user of said telephone and being lower than said back side, said top of said casing thereby being disposed at an angle facing the user of said telephone so that the keys thereon are more accessible.

11. The telephone keyset structure recited in claim 10, wherein the angle between the planes of said top and said bottom of said casing lies between 5° and 20°.

12. The telephone keyset structure recited in claim 11, wherein said angle is substantially equal to 13°.

13. The telephone keyset structure recited in claim 1, wherein said top of said casing has a grill opening between said two identations and said structure further includes a telephone speaker arranged below said top in alignment with said grill opening, thereby to transmit sound through said grill opening.

14. The telephone keyset structure recited in claim 1, wherein said mother printed circuit board includes a first jack assembly adapted for electrical connection to said handset.

15. The telephone keyset structure recited in claim 1, wherein said mother printed circuit board includes a second jack assembly adapted for electrical connection to said subscriber line.

16. The telephone keyset structure recited in claim 1, wherein said mother printed circuit board includes a third jack assembly adapted for electrical connection to an auxiliary unit to be arranged adjacent to said telephone keyset structure.

17. The telephone keyset structure recited in claim 16, wherein said auxiliary unit is a printer.

18. The telephone keyset structure recited in claim 16, wherein said auxiliary unit is a digital interface unit.

19. The telephone keyset structure recited in claim 1, wherein said key switch printed circuit board includes a fourth jack assembly adapted for electrical connection to an external speaker.

20. The telephone keyset structure recited in claim 1, wherein said sides of said casing include a front side and a back side, said front side having an opening therein for a microphone, and wherein said keyset structure further comprises a microphone for handsfree operation of said telephone.

21. The telephone keyset structure recited in claim 20, wherein said mother printed circuit board includes a fifth jack assembly adapted for electrical connection to said microphone.

22. The telephone keyset structure recited in claim 1, further comprising a speaker; a microphone; a handsfree unit printed circuit board adapted to be electrically connected with said speaker and said microphone, said handsfree unit printed circuit board being arranged above said mother printed circuit board and substantially coplanar with said daughter printed circuit board; and a third flexible, electrical cable connecting said mother printed circuit board with said handsfree unit printed circuit board.

23. The telephone keyset structure recited in claim 22, wherein said third cable is a ribbon cable.

* * * * *